US012639409B2

(12) United States Patent (10) Patent No.: US 12,639,409 B2

Hu et al. (45) Date of Patent: May 26, 2026

(54) ANTI-SPOOFING DETECTION USING MULTI-LIGHT POINT IRRADIATION

(71) Applicant: Huawei Cloud Computing Technologies Co., Ltd., Guizhou (CN)

(72) Inventors: Ziwen Hu, Hangzhou (CN); Anping Li, Shanghai (CN); Xiaoyuan Yu, Hangzhou (CN); Pu Chen, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 405 days.

(21) Appl. No.: 18/339,458

(22) Filed: Jun. 22, 2023

(65) Prior Publication Data

US 2024/0119130 A1 Apr. 11, 2024

Related U.S. Application Data

(63) Continuation of application No. PCT/CN2021/134019, filed on Nov. 29, 2021.

(30) Foreign Application Priority Data

Dec. 24, 2020 (CN) .......................... 202011546175.4
Dec. 28, 2020 (CN) .......................... 202011581653.5

(51) Int. Cl.
G06F 21/32 (2013.01)
G06V 40/16 (2022.01)
G06V 40/40 (2022.01)

(52) U.S. Cl.
CPC ............ G06F 21/32 (2013.01); G06V 40/161 (2022.01); G06V 40/40 (2022.01)

(58) Field of Classification Search
CPC ...... G06F 21/32; G06V 40/161; G06V 40/40; G06V 10/82; G06V 2201/121;
(Continued)

(56) References Cited

U.S. PATENT DOCUMENTS 8,457,367 B1 * 6/2013 Sipe ........................ G06V 40/40
382/118
2016/0112616 A1 * 4/2016 Bonifer ................. G06T 11/001
348/77
(Continued)

FOREIGN PATENT DOCUMENTS

CN 105513221 A 4/2016
CN 107832677 A 3/2018
(Continued)

OTHER PUBLICATIONS

A. F. Ebihara, K. Sakurai and H. Imaoka, "Specular- and Diffuse-reflection-based Face Spoofing Detection for Mobile Devices," 2020 IEEE International Joint Conference on Biometrics (IJCB), Houston, TX, USA, 2020, pp. 1-10 (Year: 2020).*

*Primary Examiner* — Juan M Guillermety
(74) *Attorney, Agent, or Firm* — Conley Rose, P.C.

(57) ABSTRACT

A front-end device is configured to capture a light point image of an authenticatee and send the light point image to the back-end device, where the light point image is an image captured from the authenticatee under irradiation of multi-light points, and the light point image includes a face of the authenticatee. The back-end device of the authentication system is configured to perform face anti-spoofing detection on the authenticatee based on the received light point image to obtain an authentication result.

22 Claims, 7 Drawing Sheets

Central bright spot 801

Diffusion spot 802

Non-light point region 803

(58) Field of Classification Search
CPC .. G06V 10/141; G06V 10/145; G06V 40/172;
G06V 40/45
See application file for complete search history.

(56) References Cited

U.S. PATENT DOCUMENTS

| | | | |
|---|---|---|---|
| 2016/0294824 A1* | 10/2016 | Sezille ................... | G06V 40/40 |
| 2018/0000359 A1 | 1/2018 | Watanabe | |
| 2019/0213816 A1 | 7/2019 | Grigorov et al. | |
| 2020/0218887 A1 | 7/2020 | He et al. | |
| 2020/0218916 A1* | 7/2020 | Wu ....................... | G06V 10/811 |
| 2021/0166045 A1* | 6/2021 | Kwak ................... | G06V 40/45 |
| 2021/0182584 A1* | 6/2021 | Ionita ................... | G06V 40/166 |
| 2021/0326616 A1* | 10/2021 | Lee ....................... | G06V 40/45 |

FOREIGN PATENT DOCUMENTS

| | | | |
|---|---|---|---|
| CN | 110720105 A | 1/2020 | |
| CN | 110969077 A | 4/2020 | |
| JP | 2005156942 A | 6/2005 | |

* cited by examiner

Central bright
spot 801

Diffusion
spot 802

Non-light
point region
803

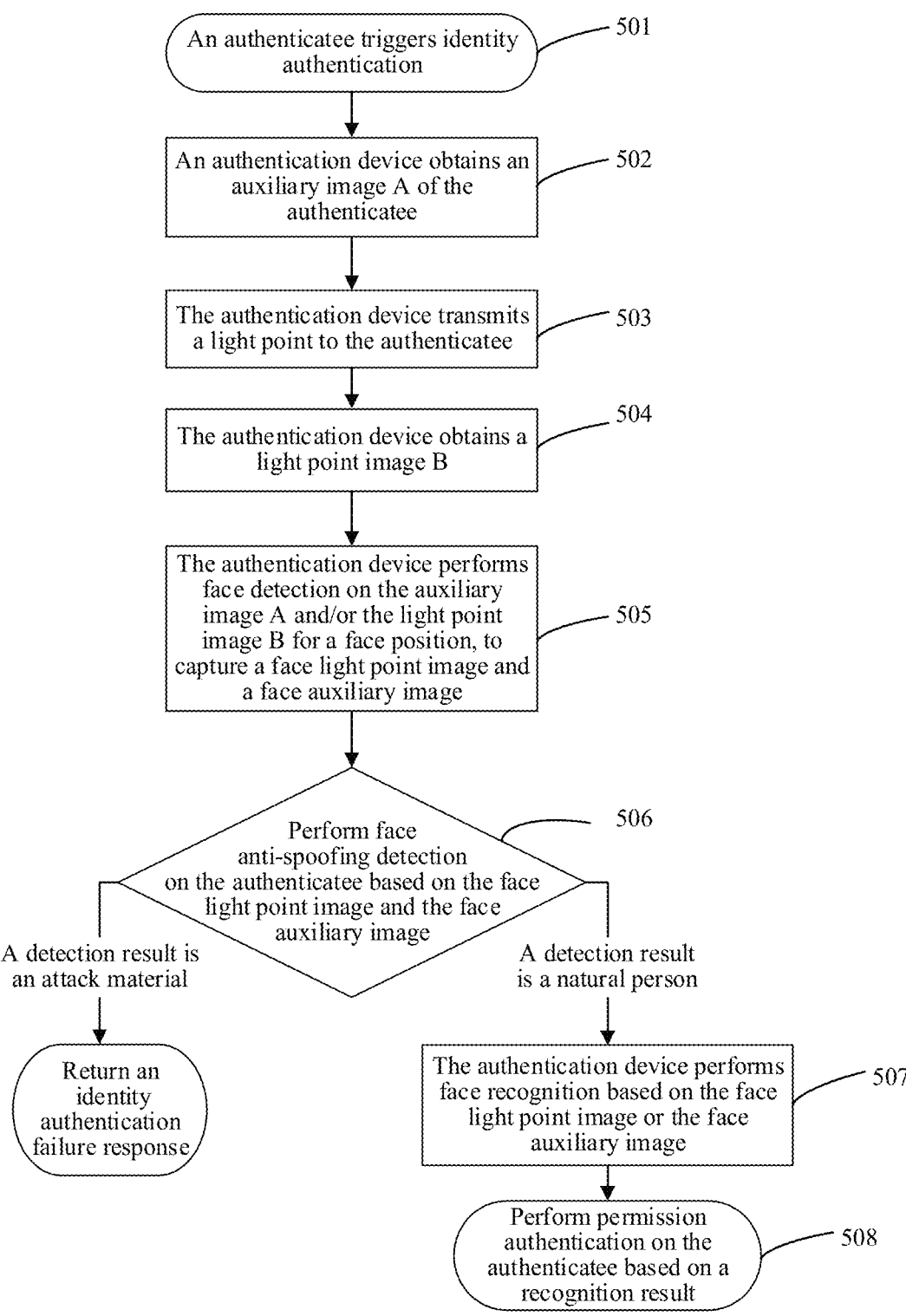

An authenticatee triggers identity authentication — 501

An authentication device obtains an auxiliary image A of the authenticatee — 502

The authentication device transmits a light point to the authenticatee — 503

The authentication device obtains a light point image B — 504

The authentication device performs face detection on the auxiliary image A and/or the light point image B for a face position, to capture a face light point image and a face auxiliary image — 505

Perform face anti-spoofing detection on the authenticatee based on the face light point image and the face auxiliary image — 506

A detection result is an attack material

A detection result is a natural person

Return an identity authentication failure response

The authentication device performs face recognition based on the face light point image or the face auxiliary image — 507

Perform permission authentication on the authenticatee based on a recognition result — 508

FIG. 12

ANTI-SPOOFING DETECTION USING MULTI-LIGHT POINT IRRADIATION

CROSS-REFERENCE TO RELATED APPLICATIONS

This is a continuation of International Patent Application No. PCT/CN2021/134019 filed on Nov. 29, 2021, which claims priority to Chinese Patent Application No. 202011581653.5 filed on Dec. 28, 2020 and Chinese Patent Application No. 202011546175.4 filed on Dec. 24, 2020. All of the aforementioned patent applications are hereby incorporated by reference in their entireties.

TECHNICAL FIELD

This disclosure relates to the field of artificial intelligence (AI) technologies, and in particular, to an authentication system, device, and method.

BACKGROUND

AI technologies have been gradually applied to various industries. Currently, in an identity authentication scenario (scenarios such as an access control system, face payment, financial authentication, and terminal unlocking), an AI-based face recognition method is generally used to authenticate a face of an authenticatee.

In various identity authentication scenarios, an authentication system needs to be highly secure to prevent an attack from an unauthorized user. For a face-based identity authentication system, an attacker generally uses a fake person attack (using a fake person to defraud authentication), a print attack (using a printed photo to defraud authentication), a screen attack (using another screen to display an image of an authenticatee to defraud authentication), and a three-dimensional (3D) mask attack (where the attacker wears a 3D mask made by imitating appearance of an authenticatee to defraud authentication) to perform illegal behavior. Therefore, it is very fragile to only identify whether a to-be-verified face belongs to an identity authentication system with a corresponding permission. To enhance security of an identity authentication system, a face anti-spoofing detection technology (also referred to as living body detection), that is, a technology for determining whether a face captured by a camera is a living body face of a natural person, is usually used in identity authentication.

A common face anti-spoofing detection method in the identity authentication system is to prompt a user to cooperate to complete interactive actions during face verification, for example, blinking, opening a mouth, turning a head, and lip language. Although this method can resist some attacks, this method still has a poor effect on many attacks. For example, an attacker can still pass verification by playing an interactive video or wearing a 3D mask. Other existing face anti-spoofing methods cannot have strong resistance to multiple common attacks. Therefore, security of the identity authentication system still needs to be improved. Therefore, how to improve security of the identity authentication system is a technical problem that needs to be urgently resolved currently.

SUMMARY

This disclosure provides an authentication system and device, and a method for performing authentication on an authenticatee. In the authentication method, a light point image captured from the authenticatee under irradiation of a light point is obtained in a manner of irradiation of the light point, and face anti-spoofing detection is performed on the authenticatee, thereby enhancing security of identity authentication.

According to a first aspect, this disclosure provides an authentication system. The system includes a front-end device and a back-end device, and the front-end device and the back-end device may communicate with each other. The front-end device is configured to capture a light point image of an authenticatee, and send the light point image to the back-end device, where the light point image is an image captured from the authenticatee under irradiation of multi-light points, and the light point image includes a face of the authenticatee. The back-end device of the authentication system is configured to receive the light point image, and perform face anti-spoofing detection on the authenticatee based on the light point image, to obtain an authentication result.

In the foregoing authentication system, the front-end device is used to capture the light point image of the authenticatee. Because the obtained light point image can reflect an optical effect of the authenticatee generated under irradiation of a light point, the back-end device, when performing face anti-spoofing detection on the light point image, may analyze and authenticate the authenticatee with reference to an optical feature included in the light point image, thereby enhancing security of the authentication system.

The front-end device in the foregoing authentication system may be a terminal device, for example, a smartphone, a tablet computer, or an access control device, and the back-end device may be a device deployed in a cloud environment or an edge environment, for example, a cloud server or an edge server. The front-end device and the back-end device exchange instructions and data through network communication. The front-end device and the back-end device may alternatively be devices deployed in a same physical environment.

In a possible implementation of the first aspect, the back-end device is configured to perform face anti-spoofing detection on the authenticatee based on a face anti-spoofing detection model and the light point image, where the face anti-spoofing detection model is a neural network model obtained through training based on images in a light point image training set. A trained neural network model is used as the face anti-spoofing detection model to perform face anti-spoofing detection on the authenticatee, so that accuracy of performing face anti-spoofing detection based on the light point image may be further improved.

In a possible implementation of the first aspect, the images in the light point image training set include a plurality of training images, and parameters of multi-light points used when the plurality of training images are captured are within a same value range as parameters of the multi-light points used when the light point image of the authenticatee is captured.

Because the images for training the face anti-spoofing detection model and the light point image captured from the authenticatee during authentication are captured in an environment with same multi-light point parameters, for materials of a same type such as faces or attack materials of a same type, optical effects of captured light point images are similar. Therefore, the face anti-spoofing detection model that is trained based on the training images may learn and distinguish features of light point images of different materials. Therefore, the trained face anti-spoofing detection model can perform accurate face anti-spoofing detection on the light point image of the authenticatee.

In a possible implementation of the first aspect, the parameters of the multi-light points used when the plurality of training images are captured include at least one of the following parameters: luminance of light, a size of a light point, a concentration degree of light points, a wavelength of light, and a light point arrangement manner.

A selection of the foregoing parameters of the multi-light points may be pre-determined by a designer through theoretical analysis and experiments, so that determined parameters of the multi-light points may enable higher distinguishability between an obtained light point image of a natural face and a light point image of an attack material.

In a possible implementation of the first aspect, the front-end device includes a light point transmitter and an image sensor; and the front-end device is configured to: transmit the multi-light points to the authenticatee through the light point transmitter; and obtain, through the image sensor, reflected light and diffused light formed by the authenticatee under irradiation of the multi-light points, to generate the light point image of the authenticatee. The front-end device may obtain a light point image that meets an authentication requirement by autonomously transmitting the multi-light points to the authenticatee.

In a possible implementation of the first aspect, the multi-light points transmitted by the light point transmitter to the authenticatee are visible light points or invisible light points. Because the multi-light points transmitted by the light point transmitter to the authenticatee may be visible light points or invisible light points, in some cases, light to be transmitted may be adaptively selected based on different application scenarios, thereby expanding application scenarios to which the authentication system can adapt.

In a possible implementation of the first aspect, the front-end device may further include a light point regulator, and the light point regulator is configured to adjust the parameters of the multi-light points transmitted by the light point transmitter. In some cases, the parameters of the transmitted multi-light points may be adaptively adjusted based on different application scenarios, so that obtained light point images can better reflect a difference between optical effects of different materials, thereby enhancing accuracy of the authentication system in different application scenarios.

In a possible implementation of the first aspect, the back-end device is configured to: input the light point image into a face detection model, and detect the face of the authenticatee in the light point image by using the face detection model, to obtain a face light point image; and further input the face light point image into the face anti-spoofing detection model, and determine, by using the face anti-spoofing detection model, whether the face of the authenticatee corresponding to the face light point image is a natural face.

In the foregoing method, face detection is first performed to obtain a face light point image, and then face anti-spoofing detection is performed by using the face light point image, so that the face light point image input into the face anti-spoofing detection model has no background feature or interference of another part of the authenticatee, and the face anti-spoofing detection model can detect the face of the authenticatee more specifically, thereby enhancing accuracy of an authentication result.

In a possible implementation of the first aspect, the back-end device is further configured to: if the face anti-spoofing detection model determines that the face of the authenticatee is a natural face, further input the face light point image into a face recognition model to obtain a face recognition result, where the face recognition result is for verifying whether the authenticatee has a permission. In the foregoing method, the authentication system can not only identify whether the authenticatee is a natural person, but also further verify whether the authenticatee is a natural person with a corresponding permission, thereby enriching functions of the authentication system and providing authentication security.

In a possible implementation of the first aspect, the front-end device is further configured to: determine a sensitive part and a non-sensitive part of the face of the authenticatee; and transmit the multi-light points to the non-sensitive part of the face of the authenticatee. The method avoids harm or stimulation to a user when the authentication system captures the light point image, and improves user friendliness of the authentication system.

In a possible implementation of the first aspect, the front-end device is further configured to obtain an auxiliary image of the authenticatee; and the back-end device is configured to perform face anti-spoofing detection on the authenticatee based on the light point image and the auxiliary image. During face anti-spoofing, the auxiliary image is added for face anti-spoofing detection together with the light point image, so that face anti-spoofing detection can not only analyze a difference between light point images formed by different materials, but also analyze a difference between auxiliary images formed by different materials, to comprehensively determine whether the authenticatee is a natural person, thereby further enhancing accuracy of face anti-spoofing detection.

In a possible implementation of the first aspect, the auxiliary image of the authenticatee includes a red-green-blue (RGB) image of the authenticatee and/or an infrared light image of the authenticatee. Because RGB images and infrared light images corresponding to a face and different attack materials are greatly different, using at least one of the foregoing two images as the auxiliary image can better enhance accuracy of face anti-spoofing detection.

In a possible implementation of the first aspect, the face of the authenticatee in the light point image includes a light point region and a non-light point region, and the light point region includes a central bright spot and a diffusion spot. The foregoing features in the light point image may be used for distinguishing whether the light point image is formed by a natural face or by an attack material.

According to a second aspect, this disclosure further provides an authentication device. The authentication device includes an image sensor and a communication interface, and the image sensor and the communication interface are communicatively connected. The image sensor is configured to capture a light point image of an authenticatee, where the light point image is an image captured from the authenticatee under irradiation of multi-light points, and the light point image includes a face of the authenticatee. The communication interface is configured to send the light point image to a remote device, and receive an authentication result obtained through face anti-spoofing detection that is performed by the remote device on the authenticatee based on the light point image.

The authentication device may be a terminal device (for example, a smartphone or a tablet computer) or a device (an access control device or an intelligent traffic camera) deployed in a specific application environment. The authentication device may also interact with the authenticatee, and provide the authentication result to the authenticatee.

In a possible implementation of the second aspect, the authentication device further includes a light point transmitter, configured to transmit the multi-light points to the authenticatee; and the image sensor is configured to obtain reflected light and diffused light formed by the authenticatee under irradiation of the multi-light points, to generate the light point image of the authenticatee.

In a possible implementation of the second aspect, the multi-light points transmitted by the light point transmitter to the authenticatee are visible light points or invisible light points.

In a possible implementation of the second aspect, the light point transmitter is configured to: determine a sensitive part and a non-sensitive part of the face of the authenticatee; and transmit the multi-light points to the non-sensitive part of the face of the authenticatee.

In a possible implementation of the second aspect, the authentication device further includes a light point regulator, and the light point regulator is configured to adjust parameters of the multi-light points transmitted by the light point transmitter, and the parameters include at least one of the following parameters: luminance of light, a size of a light point, a concentration degree of light points, a wavelength of light, and a light point arrangement manner.

In a possible implementation of the second aspect, the image sensor is further configured to: obtain an auxiliary image of the authenticatee; and the communication interface is configured to: send the light point image and the auxiliary image to the remote device, and receive an authentication result obtained through face anti-spoofing detection that is performed by the remote device on the authenticatee based on the light point image and the auxiliary image.

For beneficial effects of the authentication device in the second aspect and the authentication device in the possible implementations, refer to the beneficial effects of corresponding features in the first aspect. Details are not described herein again.

According to a third aspect, this disclosure further provides an authentication device. The authentication device includes a processor and a memory, the memory stores computer instructions, and the processor executes the computer instructions stored in the memory, to perform the following steps: receiving a light point image of an authenticatee, where the light point image is an image captured from the authenticatee under irradiation of multi-light points, and the light point image includes a face of the authenticatee; and performing face anti-spoofing detection on the authenticatee based on a face anti-spoofing detection model and the light point image, to obtain an authentication result, where the face anti-spoofing detection model is a neural network model obtained through training based on images in a light point image training set.

In a possible implementation of the third aspect, the images in the light point image training set include a plurality of training images, and parameters of multi-light points used when the plurality of training images are captured are within a same value range as parameters of the multi-light points used when the light point image of the authenticatee is captured.

In a possible implementation of the third aspect, that the processor performs face anti-spoofing detection on the authenticatee based on a face anti-spoofing detection model and the light point image includes: inputting the light point image into a face detection model, and detecting the face of the authenticatee in the light point image by using the face detection model, to obtain a face light point image; and inputting the face light point image into the face anti-spoofing detection model, and determining, by using the face anti-spoofing detection model, whether the face of the authenticatee corresponding to the face light point image is a natural face.

In a possible implementation of the third aspect, if the face anti-spoofing detection model determines that the face of the authenticatee is a natural face, the processor further performs the following step: inputting the face light point image into a face recognition model to obtain a face recognition result, where the face recognition result is for verifying whether the authenticatee has a permission.

In a possible implementation of the third aspect, that the processor performs face anti-spoofing detection on the authenticatee based on a face anti-spoofing detection model and the light point image includes: performing face anti-spoofing detection on the authenticatee based on the face anti-spoofing detection model, the light point image, and an auxiliary image of the authenticatee, where the auxiliary image of the authenticatee includes an RGB image of the authenticatee and/or an infrared light image of the authenticatee.

For beneficial effects of the authentication device in the third aspect and the authentication device in the possible implementations, refer to the beneficial effects of corresponding features in the first aspect. Details are not described herein again.

According to a fourth aspect, this disclosure further provides an authentication apparatus. The authentication apparatus includes a receiving module and a processing module. The receiving module is configured to receive a light point image of an authenticatee, where the light point image is an image captured from the authenticatee under irradiation of multi-light points, and the light point image includes a face of the authenticatee. The processing module is configured to perform face anti-spoofing detection on the authenticatee based on a face anti-spoofing detection model and the light point image, to obtain an authentication result, where the face anti-spoofing detection model is a neural network model obtained through training based on images in a light point image training set.

The authentication apparatus may be a software apparatus or a hardware apparatus. The authentication apparatus may be deployed in a local environment of an authenticator, or deployed in an edge environment or a cloud environment.

In a possible implementation of the fourth aspect, the images in the light point image training set include a plurality of training images, and parameters of multi-light points used when the plurality of training images are captured are within a same value range as parameters of the multi-light points used when the light point image of the authenticatee is captured.

In a possible implementation of the fourth aspect, the processing module is configured to input the light point image into a face detection model, and detect the face of the authenticatee in the light point image by using the face detection model, to obtain a face light point image; and input the face light point image into the face anti-spoofing detection model, and determine, by using the face anti-spoofing detection model, whether the face of the authenticatee corresponding to the face light point image is a natural face.

In a possible implementation of the fourth aspect, the processing module is further configured to: if the face anti-spoofing detection model determines that the face of the authenticatee is a natural face, input the face light point image into a face recognition model to obtain a face recognition result, where the face recognition result is for verifying whether the authenticatee has a permission.

In a possible implementation of the fourth aspect, the receiving module is further configured to receive an auxiliary image of the authenticatee, and the processing module is configured to: perform face anti-spoofing detection on the authenticatee based on the face anti-spoofing detection model, the light point image, and the auxiliary image of the authenticatee, where the auxiliary image of the authenticatee includes an RGB image of the authenticatee and/or an infrared light image of the authenticatee.

For beneficial effects of the authentication apparatus in the fourth aspect and the authentication apparatus in the possible implementations, refer to the beneficial effects of corresponding features in the first aspect. Details are not described herein again.

According to a fifth aspect, this disclosure further provides an authentication method. The method includes: obtaining a light point image of an authenticatee, where the light point image is an image captured from the authenticatee under irradiation of multi-light points, and the light point image includes a face of the authenticatee; and performing face anti-spoofing detection on the authenticatee based on the light point image, to obtain an authentication result.

In a possible implementation of the fifth aspect, the performing face anti-spoofing detection on the authenticatee based on the light point image includes: performing face anti-spoofing detection on the authenticatee based on a face anti-spoofing detection model and the light point image, where the face anti-spoofing detection model is a neural network model obtained through training based on images in a light point image training set.

In a possible implementation of the fifth aspect, the images in the light point image training set include a plurality of training images, and parameters of multi-light points used when the plurality of training images are captured are within a same value range as parameters of the multi-light points used when the light point image of the authenticatee is captured.

In a possible implementation of the fifth aspect, the parameters of the multi-light points used when the plurality of training images are captured include at least one of the following parameters: luminance of light, a size of a light point, a concentration degree of light points, a wavelength of light, and a light point arrangement manner.

In a possible implementation of the fifth aspect, the obtaining a light point image of an authenticatee includes: transmitting the multi-light points to the authenticatee through a light point transmitter; and obtaining, through an image sensor, reflected light and diffused light formed by the authenticatee under irradiation of the multi-light points, to generate the light point image of the authenticatee.

In a possible implementation of the fifth aspect, the multi-light points transmitted by the light point transmitter to the authenticatee are visible light points or invisible light points.

In a possible implementation of the fifth aspect, the performing face anti-spoofing detection on the authenticatee based on the light point image includes: inputting the light point image into a face detection model, and detecting the face of the authenticatee in the light point image by using the face detection model, to obtain a face light point image; and inputting the face light point image into the face anti-spoofing detection model, and determining, by using the face anti-spoofing detection model, whether the face of the authenticatee corresponding to the face light point image is a natural face.

In a possible implementation of the fifth aspect, the method further includes: if the face anti-spoofing detection model determines that the face of the authenticatee is a natural face, inputting the face light point image into a face recognition model to obtain a face recognition result, where the face recognition result is for verifying whether the authenticatee has a permission.

In a possible implementation of the fifth aspect, the method further includes: determining a sensitive part and a non-sensitive part of the face of the authenticatee; and transmitting the multi-light points to the non-sensitive part of the face of the authenticatee.

In a possible implementation of the fifth aspect, the method further includes: obtaining an auxiliary image of the authenticatee, where the auxiliary image of the authenticatee includes an RGB image of the authenticatee and/or an infrared light image of the authenticatee; and the performing face anti-spoofing detection on the authenticatee based on the light point image includes: performing face anti-spoofing detection on the authenticatee based on the light point image and the auxiliary image.

In a possible implementation of the fifth aspect, the face of the authenticatee in the light point image includes a light point region and a non-light point region, and the light point region includes a central bright spot and a diffusion spot.

For beneficial effects of the authentication method in the fifth aspect and the technical features in the possible implementations, refer to the beneficial effects of corresponding technical features in the first aspect. Details are not described herein again.

According to a sixth aspect, this disclosure further provides a computer-readable storage medium, where the computer-readable storage medium stores computer program code. When the computer program code is executed by a computing device, the computing device implements functions of the authentication apparatus according to the fourth aspect or the authentication apparatus according to the possible implementations of the fourth aspect. The computer-readable storage medium includes but is not limited to a volatile memory such as a random-access (RAM) memory, or a non-volatile memory such as a flash memory, a hard disk drive (HDD), or a solid-state drive (SSD).

According to a seventh aspect, this disclosure further provides a computer program product, where the computer program product includes computer program code. When the computer program code is executed by a computing device, the computing device implements functions of the authentication apparatus according to the fourth aspect or the authentication apparatus according to the possible implementations of the fourth aspect.

BRIEF DESCRIPTION OF DRAWINGS

FIG. 12 is a schematic flowchart of another identity authentication method according to an embodiment of this disclosure.

DESCRIPTION OF EMBODIMENTS

Currently, face-based identity authentication is a common identity authentication method.

Figure 1:
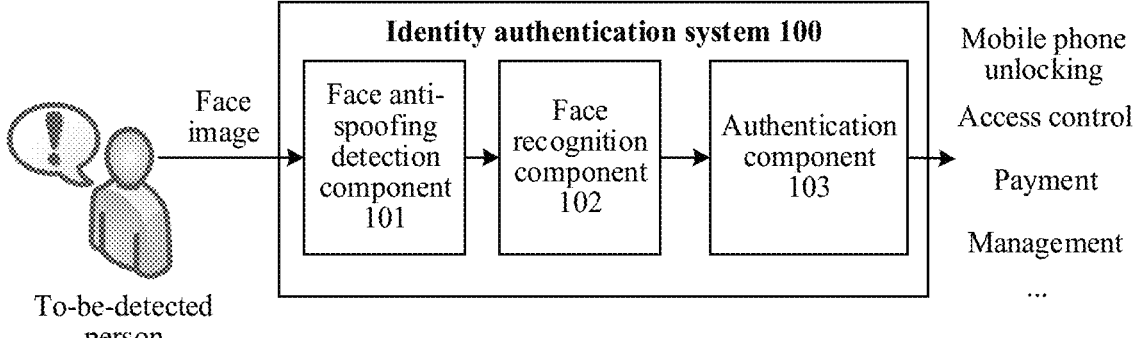
FIG. 1 is a schematic architectural diagram of an identity authentication system according to an embodiment of this disclosure.

FIG. 1 is a schematic architectural diagram of a common identity authentication system. An identity authentication system 100 obtains an image of an authenticatee, and a face anti-spoofing detection component 101 performs living body detection on a face in the image to determine whether the to-be-authenticated image is directly captured from a natural person. An image directly captured from a natural person is an image obtained by imaging, on an image sensor, light reflected and diffused by the natural person (including a face). When the face anti-spoofing detection component 101 finds that the face in the to-be-authenticated image is not a natural face, the identity authentication system does not perform subsequent face recognition authentication, and sends an alarm to the authenticatee, indicating that the authentication fails. For example, the identity authentication system plays voice to prompt that the current authenticatee is not a natural person, or to prompt that the image of the authenticatee needs to be re-captured. When the face anti-spoofing component 101 determines that the to-be-authenticated image is directly captured from a natural person, a face recognition component 102 further recognizes the face corresponding to the to-be-detected image, and sends an obtained face recognition result to an authentication component 103. The authentication component 103 verifies the face recognition result according to a preset information base or rule. After the verification succeeds, the identity authentication system 100 enables a corresponding permission for the authenticatee. The identity authentication system 100 may be used in a plurality of application scenarios, for example, mobile phone unlocking, a management system, a payment system, and an access control system. In different application scenarios, permissions after successful authentication are different.

It should be understood that FIG. 1 is merely a schematic architectural diagram of a common face-based identity authentication system, and should not be construed as a limitation on solutions of this disclosure. For example, in some embodiments, functions of the face anti-spoofing component 101 and the face recognition component 102 may alternatively be implemented by one component. In some cases, there is no obvious sequence between face anti-spoofing detection and face recognition.

The identity authentication system 100 may be a software system, a hardware system (for example, an identity authentication system formed by at least one device), or a system combining software and hardware.

In the identity authentication system 100, the face anti-spoofing detection component 101 is an important authentication component, and aims to ensure that an object on which face recognition authentication is performed is a natural person, to prevent an attacker from defrauding authentication by counterfeiting a natural person. Enhancing accuracy of face anti-spoofing detection is an important means of enhancing security of the identity authentication system 100.

Based on this, this disclosure provides an authentication method. In the method, an authenticatee is under irradiation of a light point to obtain a light point image of the authenticatee under irradiation of the light point. Face anti-spoofing detection is performed based on the light point image of the authenticatee, to obtain an authentication result, where the authentication result includes that the authenticatee is a natural person or the authenticatee is an attack material. Because an optical effect obtained under irradiation of the light point on face skin is greatly different from an optical effect obtained under irradiation of the light point on another attack material such as a 3D mask used by an attacker, whether the authenticatee is a natural person can be more effectively determined by analyzing the obtained light point image, thereby improving security of identity authentication.

Figure 2:
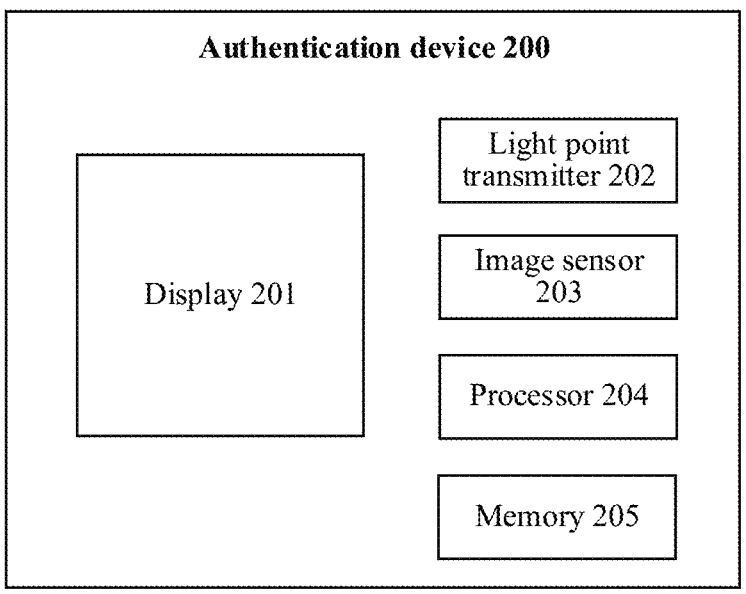
FIG. 2 is a schematic diagram of a structure of an authentication device according to an embodiment of this disclosure.

In an embodiment, the authentication method in this disclosure may be performed by an authentication device 200. The authentication device 200 may be a terminal device, for example, a smartphone, a tablet computer, an access control terminal, or a camera. As shown in FIG. 2, in an example, the authentication device 200 includes a display 201, a light point transmitter 202, an image sensor 203, a processor 204, and a memory 205. The display 201, the light point transmitter 202, the image sensor 203, the processor 204, and the memory 205 may implement a communication connection to each other through a bus.

The display 201 is configured to display an authenticatee in an identity authentication process. The display 201 may enable the authenticatee to clearly see a captured image of the authenticatee and a capturing process. The display 201 is an input/output (I/O) device. Based on different manufacturing materials, the display 201 may be classified into a liquid-crystal display (LCD), an organic light-emitting diode (OLED) display, and the like.

The light point transmitter 202 is configured to transmit a light point to the authenticatee, so that a face of the authenticatee can reflect the light point transmitted by the light point transmitter.

Light reflected by the authenticatee is imaged in the image sensor 203, and the image sensor 203 is configured to obtain a light point image under irradiation of the light point.

The processor 204 is configured to read program instructions stored in the memory 205, perform anti-spoofing detection on the light point image, and determine whether the authenticatee is a natural person. If the authenticatee is a natural person, the processor further identifies the face of the authenticatee, and determines whether the authenticatee has a corresponding permission.

The processor 204 may use a central processing unit (CPU), an application-specific integrated circuit (ASIC), a graphics processing unit (GPU), or any combination thereof. The processor 204 may include one or more chips. The processor 204 may include an AI accelerator, for example, a neural processing unit (NPU).

The memory 205 is configured to store the program instructions executed by the processor 204, and is further configured to store the light point image, data of an intermediate processing process, and the like. The memory 205 may be a read-only memory (ROM), a RAM, a hard disk, a flash memory, or any combination thereof.

It should be noted that, in the authentication device 200, the display 201 may be optional. When the authentication device 200 does not include the display 201, the authenticatee cannot see, in the identity authentication process, the captured light point image of the authenticatee and an image capturing process, and another module may still have a same function. The light point transmitter 202 is also optional. For example, a function of the light point transmitter 200 may be implemented by a device other than the authentication device 200.

The authentication device 200 has specific requirements on a computing capability and a storage capability of the device. To be specific, the processor 204 needs to have a strong computing capability, for example, the processor 204 may be an embedded AI chip specially used for deep learning computing; and the memory 205 also needs to have a strong storage capability. Because the authentication device 200 may complete all identity authentication operations independently, the device may perform identity authentication in an offline state, so that the authentication device 200 is more convenient, has a wider application scenario, and less depends on the outside. In addition, the authentication device 200 is not prone to data leakage, and has good security assurance.

In another embodiment, the authentication method in this disclosure may alternatively be jointly performed by two authentication devices.

Figure 3:
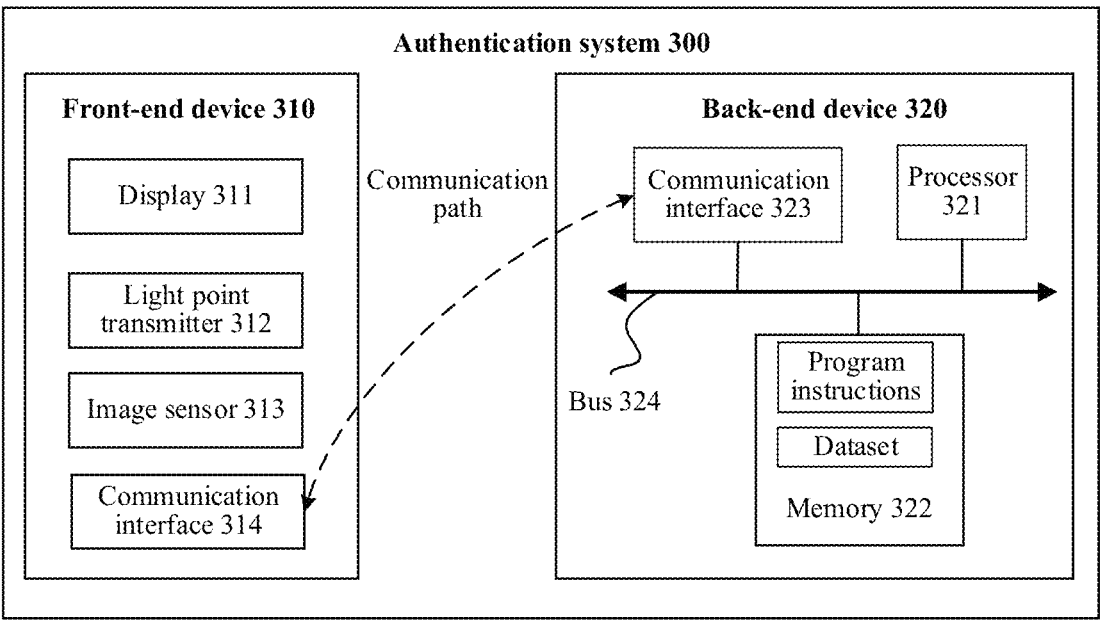
FIG. 3 is a schematic diagram of a structure of an authentication system according to an embodiment of this disclosure.

As shown in FIG. 3, an authentication system 300 includes a front-end device 310 and a back-end device 320. The front-end device 310 includes a display 311, a light point transmitter 312, an image sensor 303, and a communication interface 314, where functions of the display 311, the light point transmitter 312, and the image sensor 313 are respectively the same as or similar to the functions of the display 201, the light point transmitter 202, and the image sensor 203. Details are not described herein again. A communication interface 314 in the front-end device is configured to communicate with the back-end device 320 (specifically, communicate with a communication interface 323 in the back-end device 320), send a light point image generated by the image sensor 313 to the back-end device 320, and receive instructions or a message sent by the back-end device 320. The front-end device 310 may be understood as an authentication device that is located at a front end and that directly interacts with an authenticatee.

The back-end device 320 includes a processor 321, a memory 322, the communication interface 323, and a bus 324.

The processor 321 is configured to read program instructions in the memory 322, perform face anti-spoofing detection and face recognition on the light point image, and perform permission verification. When the authentication fails in a processing process, the processor 321 is further configured to send, by using the communication interface 323, a response message indicating that the authentication fails to the front-end device 310. After the authentication succeeds, the processor 321 is further configured to send, by using the communication interface 323, a response message indicating that the authentication succeeds to the front-end device 310, and the processor 321 is further configured to enable a corresponding permission for a person passing the authentication. Like the processor 204, the processor 321 may use a CPU, an ASIC, a GPU, or any combination thereof, or may include one or more chips. The processor 321 may further include an AI accelerator, for example, an NPU.

The memory 322 is configured to store program instructions executed by the processor 321, and is further configured to store the light point image, data of an intermediate processing process, and the like. The memory 322 may also be implemented by using one or more structures that are the same as those of the foregoing memory 205. Details are not described herein again.

The communication interface 323 uses, but is not limited to, a transceiver module such as a transceiver, to implement communication between the back-end device 320 and the front-end device 310 or a communication network.

The bus 324 may include paths for transmitting information between components (for example, the processor 321, the memory 322, and the communication interface 323) of the back-end device 320.

In some specific application scenarios, the front-end device 310 may be a smartphone, a tablet computer, or a camera, and the front-end device 310 may alternatively be an access control device of an access control system. After interacting with the authenticatee to capture the light point image of the authenticatee, the front-end device 310 sends the light point image to the back-end device 320 through a communication network, and the back-end device 320 completes identity authentication on the authenticatee.

The back-end device 320 may be deployed in different environments based on different application scenarios.

In a possible case, the back-end device 320 may be deployed in a cloud environment. The cloud environment is an entity, that includes a plurality of basic resources and uses the basic resources to provide cloud services, in a cloud computing mode. The cloud environment includes computing resources, storage resources, and network resources. The back-end device 320 may be a server or a server cluster deployed in a cloud environment, or may be a virtual machine or a virtual machine cluster running on a server in the cloud environment.

A user of the identity authentication method may create a virtual machine by purchasing a basic resource of a cloud service, to implement a function of the back-end device 320. A user of the identity authentication method may also purchase an identity authentication cloud service provided by a cloud service provider, to obtain the function of the back-end device 320. In this manner, the cloud service provider operates the identity authentication cloud service by using a basic resource of the cloud environment of the cloud service provider, and the back-end device 320 is a device that is used by the cloud service provider to implement a function of the cloud service. Because the cloud environment has rich computing resources and storage resources, when the back-end device 320 is deployed in the cloud environment and the identity authentication method is performed, a computing capability requirement of the front-end device 310 is reduced, so that the front-end device 310 can be more lightweight, and an application scenario of this solution is expanded.

In another possible case, the back-end device 320 may be deployed in an edge environment. The edge environment is an environment that is geographically close to a terminal computing device. The back-end device 320 may be an edge server or an edge server cluster, or the back-end device 320 may be a virtual machine or a virtual machine cluster running on an edge server. For example, in a transport law enforcement scenario, when identity authentication needs to be performed on a driver, the front-end device 310 may be an authentication terminal handheld by a law enforcement officer, or a small snapshot camera. The back-end device 320 may be a server deployed in a roadside edge site.

The back-end device 320 is deployed in an edge environment, so that when the identity authentication method is performed, the computing capability requirement of the front-end device 310 may also be reduced, a form of the front-end device 310 may be more flexible, and an application scenario of this solution is expanded. When the computing capability of the edge environment is sufficient, compared with that deployed in the cloud environment, the back-end device 320 deployed in the edge environment is closer to the front-end device 310 in a physical distance, communication time consumption is lower, and an authentication response can be returned to the front-end device 310 more quickly.

Figure 4:
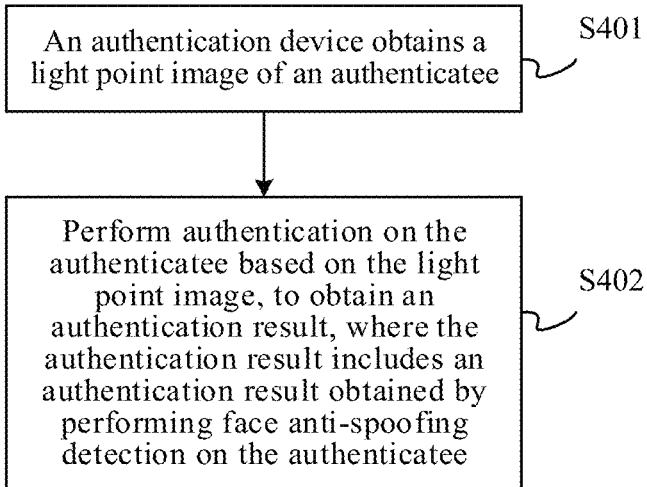
FIG. 4 is a schematic flowchart of an identity authentication method according to an embodiment of this disclosure.

The following describes an embodiment of an identity authentication method in this disclosure with reference to FIG. 4. The method may be performed by the foregoing authentication device 200, or may be performed by the authentication system 300 formed by the front-end device 310 and the back-end device 320. For brevity of description, it is described below as an example that the method is performed by an authentication device.

S401: Obtain a light point image of an authenticatee.

The light point image of the authenticatee indicates an image captured from the authenticatee under irradiation of multi-light points, and the light point image includes a face of the authenticatee.

The obtaining a light point image of an authenticatee may include that the authentication device transmits the multi-light points to the authenticatee, to capture the image of the authenticatee under irradiation of the multi-light points. This manner may be referred to that the authentication device captures the light point image independently. The obtaining a light point image of an authenticatee may alternatively include that the authentication device receives a light point image sent by another device (for example, a camera or a smartphone). For example, the back-end device 320 receives the light point image sent by the front-end device 310.

Figure 5:
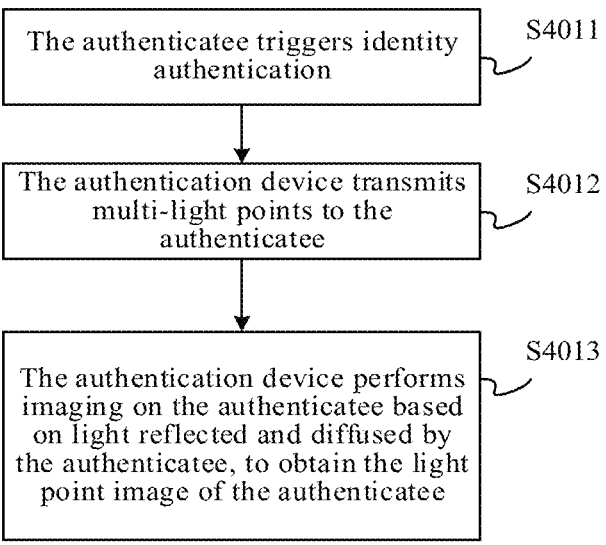
FIG. 5 is a schematic flowchart of capturing a light point image of an authenticatee by an authentication device according to an embodiment of this disclosure.

The following describes in detail, with reference to a schematic flowchart in FIG. 5, the step that the authentication device captures the light point image of the authenticatee independently:

S4011: The authenticatee triggers identity authentication.

In different application scenarios, the authenticatee may trigger identity authentication in different manners. For example, in a scenario where the authentication device is a smartphone, the authenticatee may trigger identity authentication by tapping a specific button on a graphical user interface (GUI) when using an application (APP). The smartphone may also trigger identity authentication by using some sensors when being picked up by the authenticatee. In a scenario where the authentication device is an access control device, identity authentication may be triggered when the authenticatee appears in a monitoring range of a camera of the authentication device.

S4012: The authentication device transmits the multi-light points to the authenticatee.

After the authenticatee triggers identity authentication, the authentication device may transmit the multi-light points to the authenticatee. The authentication device needs to have a light point transmitter to transmit a light point to the authenticatee. Based on different structures and principles of the light point transmitter, the authentication device may transmit the multi-light points to the authenticatee in different manners. The following lists several feasible manners with reference to possible structures of the light point transmitter:

1. The authentication device converts light transmitted by a light-emitting element into multi-light points through a light point converter, and transmits the multi-light points to the authenticatee.

Figure 6:
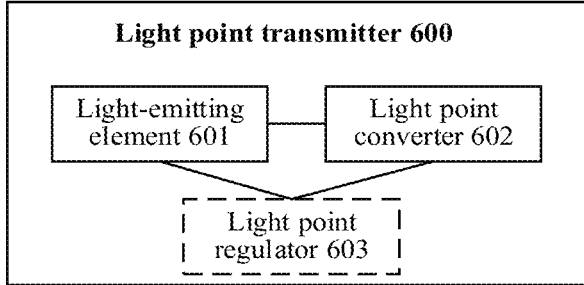
FIG. 6 is a schematic diagram of a structure of a light point transmitter according to an embodiment of this disclosure.

As shown in FIG. 6, a light point transmitter 600 includes a light-emitting element 601 and a light point converter 602. It should be understood that the light point transmitter 600 may be the light point transmitter 202 in the foregoing authentication device 200, or may be the light point transmitter 302 in the foregoing front-end device 310.

The light-emitting element 601 may be a laser, or a light-emitting diode (LED)). The light-emitting element 601 is configured to transmit visible light or invisible light. The light point converter 602 is configured to convert light transmitted by the light-emitting element 601 into multi-light points. The light point converter 602 may be implemented by using a plurality of structures. For example, the light point converter 602 may be a multi-prism, and the light transmitted by the light-emitting element is converted into multi-light points by refraction of the multi-prism on the light. The light point converter 602 may alternatively generate multi-light points by using a diffraction grating or a lens array. Optionally, the light point converter 602 may include some auxiliary components, such as a collimator and a beam expander, to improve light quality.

Luminance and a wavelength of the light transmitted by the light-emitting element 601, and a size, a quantity, an arrangement manner, and a concentration degree of light points generated by the light point converter 602 may be determined by materials and structures of the light-emitting element 601 and the light point converter 602. In this disclosure, a light point image obtained by irradiating the light point transmitted by the light point transmitter 600 on face skin of a natural person needs to be clearly distinguished from a light point image obtained by irradiating the light point transmitted by the light point transmitter 600 on an attack material. Therefore, in this disclosure, parameters the light transmitted by the light-emitting element 601 and parameters of the multi-light points converted by the light point converter 602 need to meet a preset condition. Generally, related parameters of light may be determined with a combination of a theory and an experiment, and then the light-emitting element 601 and the light point converter 602 are selected and designed, so that the parameters of the multi-light points transmitted by the light point transmitter meet the preset condition.

Parameters of the light that need to be determined in advance include: (1) Luminance of the light. The luminance of the light needs to be moderate, and it is required that phenomenon of overexposure does not occur when the light point is irradiated on a face. It is acceptable that the light point does not cause overexposure when the light point is irradiated on another attack material. (2) Wavelength of light. The wavelength of the light may be determined by measuring a spectral response of a face of a natural person and a common attack material (for example, paper, a screen, a silicone mask, and a resin mask) used by an attacker. A wavelength range where a response to the face of a natural person clearly differs from a response to the other attack material needs to be selected. (3) A concentration degree of light points. When determining the concentration degree of light points, the light points cannot be excessively dense, and a distance between the light points needs to be greater than a diffusion diameter of a diffusion spot, to prevent regions of each light point in the light point image from overlapping each other. In addition, the light points cannot be excessively sparse. Sufficient light points need to be ensured in a face region, to facilitate feature analysis during subsequent face anti-spoofing detection. (4) A light point arrangement manner. The light points may be arranged in a regular dot matrix, or may be arranged in a manner with no obvious regularity based on a requirement. The light point may also be arranged, based on a structure of a common face, in a manner of avoiding a sensitive region (for example, eyes) of a face. (5) A size of a light point. The size of the light point cannot be too small. Otherwise, a central bright spot and a diffusion spot are not clear, and cannot be used for feature analysis during subsequent face anti-spoofing detection. (6) Luminance of light in a non-light point region. In some cases, in addition to transmitting the light point, the light point converter may further transmit a specific amount of light, so that the non-light point region is also irradiated to some extent. Light in the non-light point region needs to be evenly irradiated to provide a good background for entire imaging and supplement global information of the authenticatee. The luminance is lower than that of the light point, to avoid affecting imaging of the diffusion spot. A specific attenuation ratio may be selected, for example, the luminance is consistent with the luminance of the diffusion spot at the attenuation ratio of 0.1. It should be understood that, in some other cases, supplementary irradiation may not be performed on the non-light point region.

For example, the foregoing parameters may be determined by manually pre-constructing optical property models of a face and a common attack material. Then, light points with different luminance, wavelengths, sizes, concentration degrees, arrangement manners, and the like are projected. Then, a movement trace of each photon in each material is simulated by using a Monte Carlo method and the like, positions and a quantity of final emergent photons are obtained, and the light point image can be obtained. After light point images of different materials under irradiation of light points with different parameters are obtained, a narrow range parameter group with a good differentiation degree may be selected. Several groups of parameters are selected from a parameter range, and an experiment is carried out with the face of a natural person and the attack material to determine appropriate parameters. When selecting the parameters, security of a corresponding light point needs to be guaranteed. Because the light point may irradiate the face, parameters such as a power and a wavelength should be controlled to avoid damage to each part, especially eyes, of the face.

After the parameters of the light are determined, the light point transmitter 600 is designed, so that the light point transmitter 600 can transmit a high-quality light point, to obtain a great imaging difference between the face of a natural person and the other attack material.

It should be understood that, determination of the foregoing parameters and a design of the light point transmitter 600 are pre-prepared work before the authentication device is configured to perform the identity authentication method in this disclosure, and may be manually completed with a combination of a theory and practice.

Optionally, the light point transmitter 600 may further include a light point regulator 603. The light point regulator 603 is configured to adjust the parameters of the light. The light point regulator 603 may adjust the parameter of the multi-light points after the light point converter 602 completes conversion of the multi-light points. The light point regulator 603 may further adjust the light transmitted by the light-emitting element 601. In some application scenarios, the authentication device needs to adapt to an external environment, and adjust, in different environments, transmitted light points to some extent. Therefore, the light point regulator 603 needs to adaptively adjust the parameters of the light to some extent. For example, the light point regulator 603 includes an external light sensor. When the external light sensor perceives that the external environment is dark, the light point regulator 603 adjusts the luminance of the light point, so that the obtained light point image may be clear and the face is clearly different from the other attack material. Optionally, when the external light sensor perceives that the external environment is dark, the light point regulator may also increase luminance of light irradiated to the non-light point region, so that entire imaging quality of the light point image is good.

A structure of the foregoing light point transmitter 600 may enable the authentication device to convert light transmitted by the light-emitting element 601 into multi-light points through the light point converter 602, to transmit the multi-light points to the authenticatee.

The following describes another manner that the authentication device transmits a light point to the authenticatee with reference to another structure of the light point transmitter:

2. The light point transmitter adjusts, by using a light point scanner, different transmission paths of light transmitted by a light-emitting element, to implement light point scanning on the authenticatee.

Figure 7:
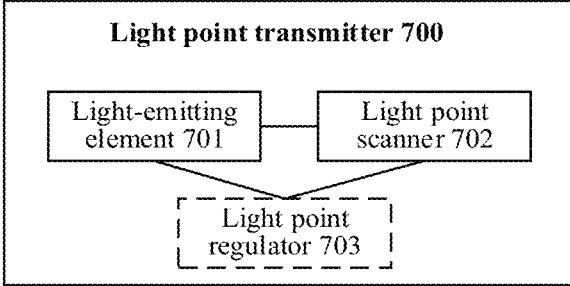
FIG. 7 is a schematic diagram of a structure of another light point transmitter according to an embodiment of this disclosure.

As shown in FIG. 7, a light point transmitter 700 includes a light-emitting element 701 and a light point scanner 702. Optionally, the light point transmitter 700 may further include a light point regulator 703. It should be understood that, the light point transmitter 700 may be the light point transmitter 202 in the foregoing authentication device 200, or may be the light point transmitter 302 in the foregoing front-end device 310.

A function and a possible structure of the light-emitting element 701 may be the same as those of the light-emitting element 601. Details are not described herein again. The light point scanner 702 is configured to convert light transmitted by the light-emitting element 701 into at least one light point, and adjust a propagation path of a converted light point. A structure of the light point scanner 702 may be formed by combining or coupling a structure of the light point converter 602 with at least one displacement unit. Control of a light point propagation path by the displacement unit may be implemented through software instructions, so that at least one light point moves under the control of the software instructions, thereby implementing light point scanning on the authenticatee.

A function of the light point regulator 703 is also similar to a function of the light point regulator 603. Details are not described herein again.

Both the foregoing two methods enable the authentication device to transmit the light point to the authenticatee. It should be understood that the light point transmitter may be a component loosely coupled to or combined in a physical structure with another component of the authentication device, or may be a component strongly coupled to another component of the authentication device. When the authentication device is a device including a display screen, the light point transmitter may also be a light-emitting display screen, and light-emitting of each element on the screen may be controlled by software, so that the screen transmits multi-light points or transmits scanning light points with time.

Optionally, before the authentication device performs S4012, the authentication device may further perceive and recognize a face of the authenticatee and a sensitive part of the face, for example, an eyes region. After the recognition, the authentication device performs S4012 to transmit the light points to the authenticatee. When the light points are transmitted, the light points are transmitted by using the face of the authenticatee as a center, and the eyes region is avoided. A method for recognizing the face and the eyes may be implemented through a temperature sensor, deep learning, or the like. It should be understood that any manner that can recognize the face and the eyes is applicable to the optional step in this disclosure. This is not limited in this disclosure.

S4013: The authentication device performs imaging on the authenticatee based on light reflected and diffused by the authenticatee, and obtains the light point image of the authenticatee.

To implement S4013, the authentication device needs to have an image sensor. Light points reflected or diffused by the authenticatee and that are captured by the authentication device are mapped to a light receiving surface of the image sensor. The image sensor is usually designed with a sensing coating. The sensing coating is the light receiving surface. Light transmitted into the sensing coating may form an optical image of the light reflected and diffused by the authenticatee. The image sensor may further convert the optical image into a corresponding analog electrical signal, or may further convert the optical image into a digital signal, to form the light point image of the authenticatee. It should be understood that a structure of the image sensor is not limited in this disclosure. Optionally, the authentication device may further include another structure, for example, a lens, or an image capturing switch.

It should be understood that the designed image sensor may adapt to and match a wavelength or luminance of a transmitted light point, so that an image of the authenticatee obtained by the image sensor is clear and imaging of a natural person and imaging of an attack material can be distinguished from each other.

It should be further understood that, the authentication device may obtain at least one light point image of the authenticatee through the image sensor. For example, in a case that the authentication device transmits multi-light points to the authenticatee through the light point transmitter 600 in FIG. 6, because the authenticatee may be irradiated by multi-light points with a moderate concentration degree at one moment, one light point image may be captured, or several light point images may be captured. In a case that the authentication device performs light point scanning on the authenticatee through the light point transmitter 700 shown in FIG. 7, because positions of the authenticatee that are irradiated by the light point at different moments may be different, several light point images may be captured to obtain images of the authenticatee that are irradiated by the light point at different positions.

Figure 8:
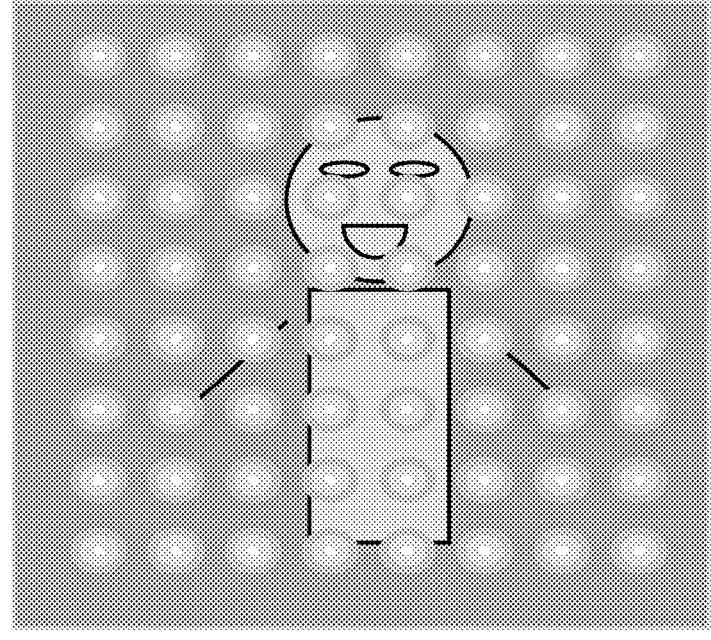
FIG. 8 is a schematic diagram of a light point image of an authenticatee according to an embodiment of this disclosure.

FIG. 8 is an example of a light point image of an authenticatee. The face and another part of the authenticatee may be irradiated by the light point and the captured light point image may include the face and the other part of the authenticatee. If the light point transmitted by the light point transmitter to the authenticatee is a light point of visible light, or the image sensor is a special image sensor adapted to the wavelength of the light point, a light point region and a non-light point region can be determined through the obtained light point image by naked eyes.

Figure 9:
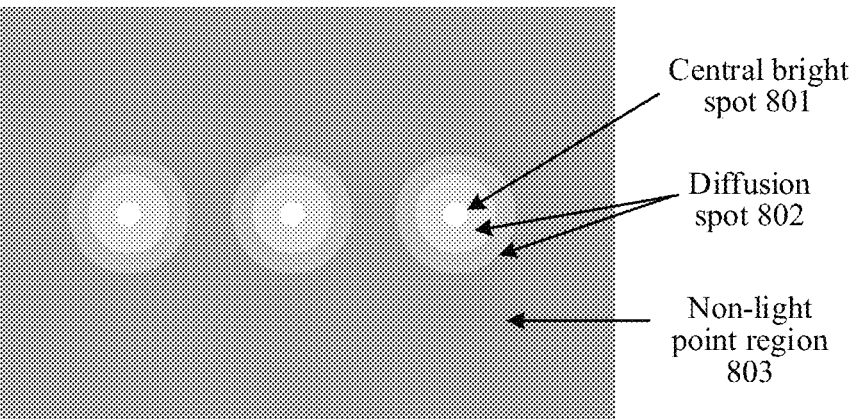
FIG. 9 is a schematic diagram of details of a light point image according to an embodiment of this disclosure.

FIG. 9 is a schematic diagram of details of a light point image. As shown in FIG. 9, a central bright spot 801 and a diffusion spot 802 are formed in a light point image formed under irradiation of a light point, and a non-light point region 803 is formed in a region that is not irradiated or diffused by the light point. The central bright spot 801 is mainly obtained by the light point reflected on a surface of an object or inside the object. The diffusion spot 802 is mainly obtained by a diffusion effect of the light point on a surface layer of the object. The diffusion spot 802 may include one or more layers. In FIG. 9, an example where the diffusion spot 802 includes only two layers is used.

Figure 10:
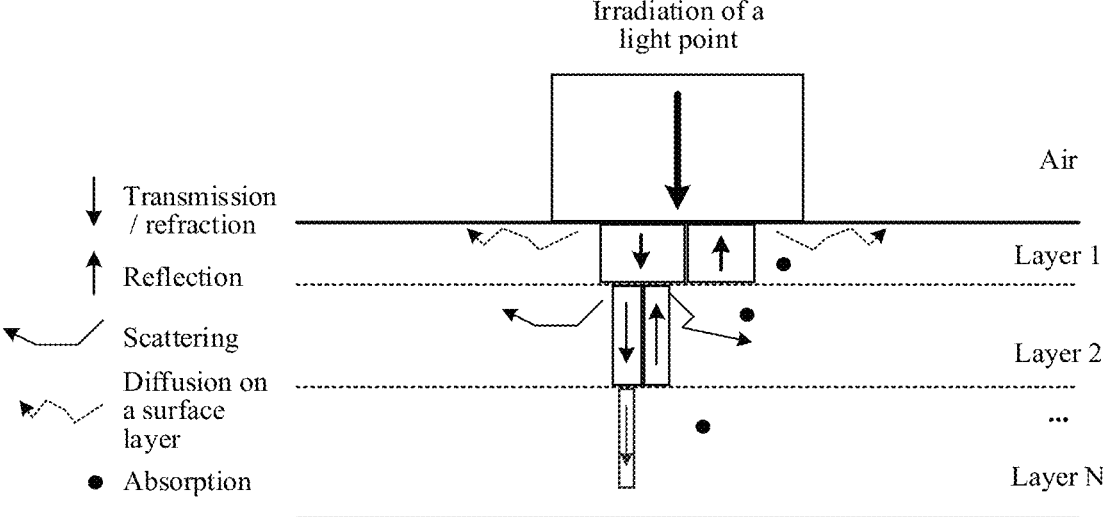
FIG. 10 is a schematic diagram of propagation of a light point according to an embodiment of this disclosure.

FIG. 10 is a schematic diagram of propagation of a light point irradiated to an object. As shown in FIG. 10, when light is propagated to a surface of an object by air, a part of the light is projected and refracted to the inside of the object, and the part of the light is further transmitted and scattered inside the object. A part of the light is absorbed during transmission and scattering at each layer, and another part of the light is reflected and diffused on a surface layer of the object. The reflected light and the light diffused on the surface layer may form the central bright spot 801 and the diffusion spot 802 shown in FIG. 9 through imaging of an image sensor.

The identity authentication method in this disclosure is designed to emit a light point with high energy density to the authenticatee, so that a more obvious optical effect difference, for example, a diffusion effect, reflection, or absorption effect difference, can be shown when the light point is irradiated on the object. In addition, a transmission depth of the light point is larger, and more interaction can occur between the light point and the inside of the object, so that the obtained light point image carries more information. In addition, optical effects of light on different materials are different. For example, a radius and a layer of a central bright spot and a diffusion spot formed by a light point irradiated on a human body surface are different from those of a common attack material such as resin. Therefore, the light point image obtained in step S401 may be used for face anti-spoofing detection, to implement more accurate identity authentication.

The following continues to describe how to perform identity authentication based on the light point image in this disclosure.

S402: Perform authentication on the authenticatee based on the light point image, to obtain an authentication result, where the authentication result includes an authentication result obtained after face anti-spoofing detection is performed on the authenticatee.

In some embodiments, the authentication device may perform feature extraction and analysis on the light point image based on a trained face anti-spoofing detection model, and output an authentication result. The authentication result indicates whether the light point image is an image directly formed by a natural person.

The face anti-spoofing detection model may be a trained AI model. For example, the face anti-spoofing detection model may use a neural network model that can be used for classification or anomaly detection in the industry, such as a common classification neural network model: VGG, ResNet, MobileNet, and DenseNet; and a common anomaly detection neural network model: One-Class SVM, Isolation Forest, Local Outlier Factor, Auto-encoder and Deep SVDD. A specific structure of the neural network model is not limited in this disclosure.

For example, MobileNet V2 may be used as a basic model of the face anti-spoofing detection model. Main features of MobileNet V2 include an inverted residual structure, depthwise separable convolution, and a linear loss function. The network is a lightweight design, can significantly reduce model parameters and calculation workload, and ensure accuracy equivalent to that of a large model. The light point image may be input into a trained MobileNet V2 model. The model may output, through feature extraction and classification, a probability that the light point image is a living body image formed by a natural person or an attack material image, or output a classification result of the light point image. Therefore, it may be determined whether the authenticatee is a natural person.

The training on the face anti-spoofing detection model may be performed by the authentication device or another device. Before the face anti-spoofing detection model is trained, a light point image training set needs to be constructed first. The light point image training set includes a plurality of face light point training images and a plurality of attack material light point training images. The face light point training image may be labeled as a positive sample, and the attack material light point training image may be labeled as a negative sample. In a training process, the model gradually adjusts parameters of each layer in the model based on a loss function between a prediction result and a label, so that the model gradually learns how to distinguish a positive sample from a negative sample based on a feature in the positive sample and a feature in the negative sample.

It should be understood that, when the face light point training images and the attack material light point training images in the light point image training set are obtained, a light point transmitter also needs to be used to transmit a light point to a natural person, to capture a face light point training image formed by the natural person, and the light point transmitter further needs to be used to transmit a light point to an attack material (for example, a 3D mask and a screen), to capture an attack material light point training image formed by the attack material. Generally, parameters (for example, a wavelength of light, luminance of light, a size of a light point, a concentration degree of light points, and a light point arrangement manner) of light transmitted by the light point transmitter when light point training images are obtained should be in a same range with parameters of multi-light points transmitted to an authenticatee during identity authentication, so that the face anti-spoofing detection model obtained through training can more accurately determine a light point image during authentication, thereby improving accuracy of face anti-spoofing detection. It should be understood that parameters in a same range indicate that the parameters are the same or float within a specific error range. For example, a wavelength of a light point transmitted when the light point training image is obtained is any dynamic value in a range of [750 nanometers (nm), 760 nm]; and during identity authentication, a wavelength of a light point transmitted to an authenticatee is also a value in the range of [750 nm, 760 nm]. Generally, light point transmitters of a same structure, a same material, and a same design may be used to capture the light point training image and capture the light point image during identity authentication.

Figure 11:
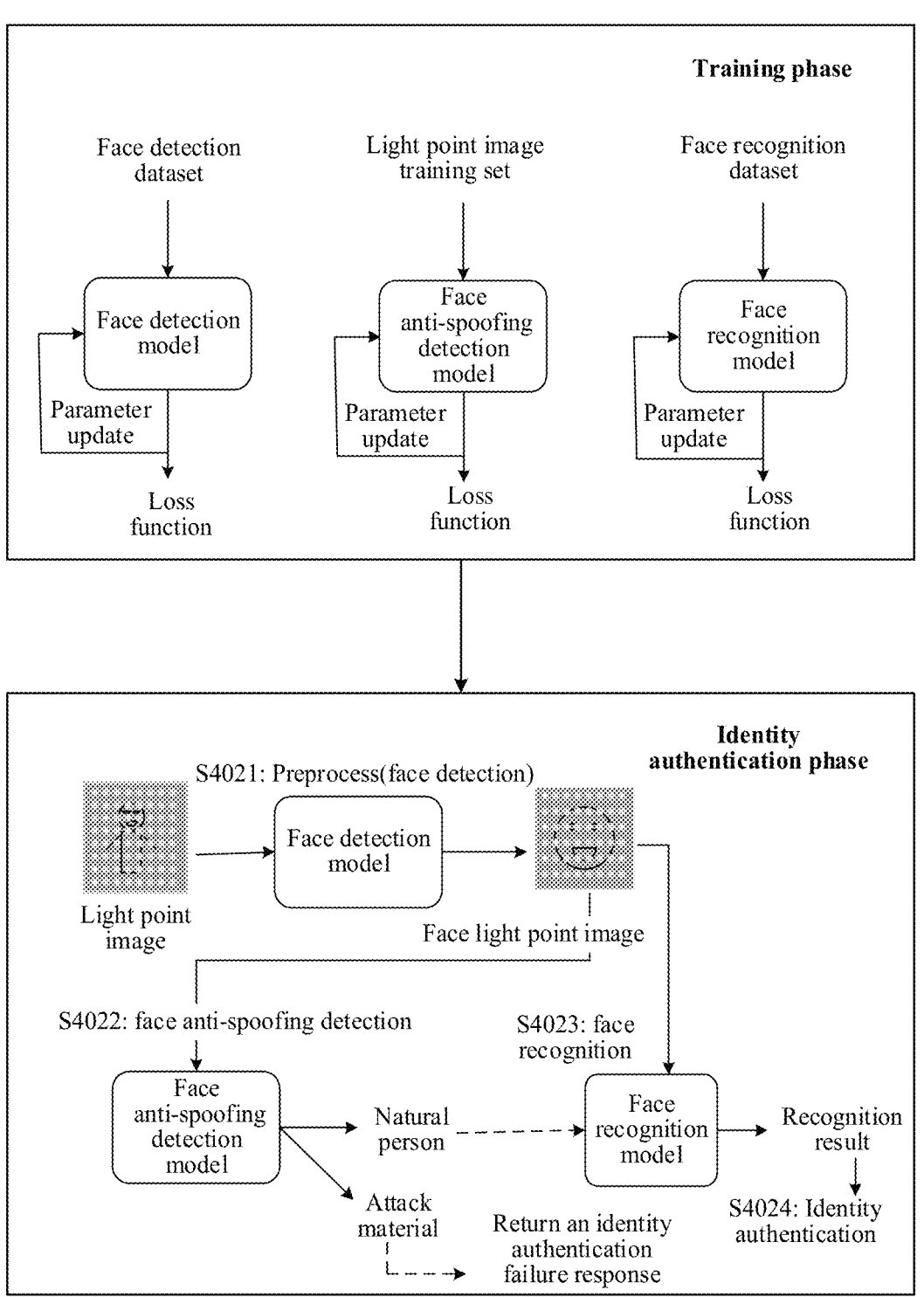
FIG. 11 is a schematic flowchart of performing identity authentication based on a light point image according to an embodiment of this disclosure.

FIG. 11 is a schematic specific flowchart of performing identity authentication based on a light point image. The schematic flowchart shown in FIG. 11 is divided into two phases: a training phase and an identity authentication phase. The training phase is mainly a phase of training an AI model required in the identity authentication phase. As shown in FIG. 11, the training phase includes training a face detection model, a face anti-spoofing detection model, and a face recognition model. In the training phase, the authentication device may complete training of each model, or another device or device cluster may complete training of each model. The foregoing three models may be trained together in a cascading manner, or may be separately trained. The identity authentication phase is mainly a process of treating a light point image through a trained AI model, to implement identity authentication on an authenticatee based on the light point image, to obtain an authentication result. As shown in FIG. 11, performing identity authentication in the identity authentication phase may include the following steps:

S4021: Preprocess the light point image to obtain a face light point image

The captured light point image generally includes not only a face of the authenticatee, but also some surrounding environments, another part of the authenticatee, and the like. To more accurately perform face anti-spoofing detection and face recognition on the authenticatee, after obtaining the light point image, the authentication device performs a most important step of performing detection on a face in the light point image, to capture a face light point image with fewer interference factors from the light point image. The face detection model trained in the training phase may be used to perform face detection on the light point image. The face detection model is not limited to using a deep learning model or a machine learning model as a basic model.

Before the face detection model is trained in the training phase, a face detection dataset of light point images also needs to be constructed in advance. A specific manner is to obtain a plurality of light point training images by using an image obtaining device including a light point transmitter. The light point training image may include an image formed by a natural person under irradiation of a light point, and may also include a face forged by an attack material or an image formed by a person under irradiation of the light point. The attack material may include paper, a screen, a silicone mask, a latex mask, or a resin mask. To construct the face detection dataset, a captured light point training image further needs to be labeled. A position of a face in the light point training image may be labeled by a rectangular box. For example, the position is generally represented by center coordinates and a length and a width of the rectangle, namely, (x0, y0, w, h).

For example, a RetinaFace model may be used as a basic model of the face detection model. The RetinaFace model is mainly based on a feature pyramid structure, and can enhance detection effects of faces in different scales. A labeled light point training image may be scaled to a specific scale and then input to the RetinaFace model, aiming at minimizing a total loss, to perform network parameter update through back propagation and a gradient descent algorithm, and iteration is performed over and over again until the total loss converges or reaches a specified condition, for example, accuracy of a validation set does not increase, or a specified quantity of training times is reached. Then model training is completed, and a trained face detection model is obtained. In some other embodiments, a face detection model that has high detection precision and has been trained in the industry may be used for face detection in this disclosure. In this way, resources and time costs for training the face detection model can be reduced.

The trained face detection model is configured to obtain a face light point image in the identity authentication phase. After the light point image is input into the trained face detection model, a multi-dimensional feature map is obtained through feature extraction. The model further parses the feature map to obtain a large quantity of detection boxes, then non-maximum suppression processing is performed to obtain information of the detected face boxes, and a corresponding image is captured from the light point image based on the information of the face boxes. That is, a face light point image is obtained.

It should be understood that the preprocessing the light point image to obtain a face light point image in S4021 may further include some other steps, for example, performing contrast adjustment and scale adjustment on the obtained face light point image.

S4022: Perform face anti-spoofing detection on the authenticatee based on the face light point image and a face anti-spoofing detection model.

In this step, the face anti-spoofing detection model also needs to be trained in the training phase. In the training phase, face light point training images and attack material light point training images need to be captured as data required for model training. By ensuring that the parameters of the light point transmitted when the training images are captured are in the same range with the parameters of the light point transmitted to the authenticatee in the identity authentication phase, the trained face anti-spoofing detection model can more accurately determine whether the authenticatee in the light point image obtained under the group of parameters is a natural person. A size and a face-to-image proportion of the face light point image in the identity authentication phase may also be kept in a same range with sizes and face proportions of the face light point training image and the attack material light point training image that are used in the training phase, so that a face anti-spoofing detection result of the model is more accurate.

The face light point image is input into the trained face anti-spoofing detection model, and a face anti-spoofing detection result may be obtained through inference of the model. The result includes that the authenticatee is a natural person or an attack material. For a structure and an inference process of the face anti-spoofing detection model, refer to the foregoing descriptions. Details are not described herein again.

When the face anti-spoofing detection result indicates that the authenticatee is an attack material, the authentication device may return an identity authentication failure response to the authenticatee through voice or text, and prompt the authenticatee to continue to perform authentication by using a natural face, or generate an alarm. In this case, face recognition is not continued in the identity authentication phase. When the face anti-spoofing detection result indicates that the authenticatee is a natural person, the result indicates that face anti-spoofing detection is passed, and the face light point image obtained in S4021 may continue to be used for face recognition. That is, step S4023 continues to be performed.

S4023: Recognize the face light point image based on a face recognition model, to obtain a recognition result.

In some embodiments, in this step, the used face recognition model also needs to be trained in the training phase. A basic model of the face recognition model may be neural network models that can be used for face recognition in the industry, for example, FaceNet and VGG. A face recognition dataset needs to be used for training the face recognition model. The face recognition dataset includes a plurality of labeled face training images. The face training image may be a face training image captured under irradiation of a light point, or may be a face training image captured under natural light. A method for labeling the face training image is to set a label for a face in the face training image, where the label may be a name of a person or an identifier of a person. A method for training a face recognition model in this disclosure may be a common model training method in the art. Details are not described herein again.

In some other embodiments, the face recognition model may alternatively be a model trained in another system or another device. For example, a trained face recognition model used by an access control system in an enterprise may be directly reused in a secret information management system of the enterprise, and the face recognition model is a model trained based on face training images of all employees in the enterprise.

The face light point image is input into the foregoing trained face recognition model, and a face recognition result may be obtained through inference, where the recognition result may be a name or an identifier of a face corresponding to the face light point image.

S4024: Perform identity authentication on the authenticatee based on the recognition result.

After the recognition result is obtained, identity authentication may be further performed on the authenticatee by comparing a permission maintenance table or in other manners. For example, after the authenticatee is detected and recognized in the foregoing steps, it may be learned that the authenticatee is Zhang San rather than disguised Zhang San. In this case, the authentication device may continue to query a permission of Zhang San. If the permission maintenance table indicates that Zhang San has a permission to pass the authentication, the authentication device returns an identity authentication success response to the authenticatee, and enables a corresponding permission. If the permission maintenance table indicates that Zhang San does not have the permission to pass the authentication, the authentication device returns an authentication completion response without a corresponding permission to the authenticatee.

After the foregoing steps S4021 to S4024, identity authentication can be more accurately completed on the authenticatee. In addition, because the face anti-spoofing detection model used in the identity authentication phase is a model that is trained in advance based on light point training images, the model can accurately extract and discover features in the light point image, and distinguish between features of light point images formed by different materials. Therefore, it may be determined whether the authenticatee is a natural person or a person disguised by an attack material, thereby improving accuracy of face anti-spoofing detection.

It should be noted that an identity authentication procedure in the foregoing steps S4021 to S4024 is merely an example embodiment. In some other embodiments, functions of the face detection model and the face anti-spoofing detection model may alternatively be implemented through a deep learning model. To be specific, the face in the light point image may be detected and face anti-spoofing detection may be completed by inputting the light point image into a deep learning model. In some other embodiments, functions of the face anti-spoofing detection model and the face recognition model may alternatively be implemented through a deep learning model, or functions of the face detection model, the face anti-spoofing detection model, and the face recognition model may alternatively be implemented through a deep learning model. To be specific, end-to-end identity recognition and authentication are completed through a deep learning model.

This disclosure further provides an embodiment of another identity authentication method. In another embodiment, the authentication device not only obtains the light point image of the authenticatee, but also obtains an auxiliary image formed by the authenticatee, where the obtained auxiliary image may be an image of the authenticatee captured through an RGB camera, or an infrared light image of the authenticatee captured through an infrared camera. Because an auxiliary image formed by an attack material is different from an auxiliary image formed by a natural face to some extent, so that performing face anti-spoofing detection by using the light point image and the auxiliary image together can obtain a more accurate result.

With reference to FIG. 12, the following describes an embodiment procedure of performing identity authentication with reference to a light point image and an auxiliary image.

S501: An authenticatee triggers identity authentication.

For a specific manner of triggering identity authentication by the authenticatee in this step, refer to the descriptions in step S4011. Details are not described herein again.

S502: An authentication device obtains an auxiliary image A of the authenticatee.

In this step, the authentication device may be a device equipped with an infrared camera or an RGB camera. For example, the authentication device obtains an infrared image of the authenticatee as the auxiliary image A. A manner in which the authentication device obtains the auxiliary image A of the authenticatee may be: the authentication device first transmits infrared light to the authenticatee through an infrared light transmitter, then obtains infrared light reflected by the authenticatee, and generates an infrared image through an infrared image sensor as the auxiliary image A.

S503: The authentication device transmits a light point to the authenticatee.

For a specific implementation of this step, refer to the descriptions of step S4012. Details are not described herein again.

It should be noted that, in this embodiment, the authentication device may be a device including a three-dimensional structured light camera. The three-dimensional structured light camera may obtain an infrared light image, or may obtain an RGB image. The three-dimensional structured light camera may further encode and convert light transmitted by a light-emitting element, and transmit a light point to the authenticatee.

S504: The authentication device obtains a light point image B.

For a specific implementation of this step, refer to the descriptions of step S4013. Details are not described herein again. When the authentication device is a device including a three-dimensional structured light camera, the authentication device may form a speckle image based on reflected light and diffused light of the authenticatee, where the speckle image is also a light point image. The speckle image obtained through a three-dimensional structured light camera in the industry is mainly used for reconstructing a depth map. However, an original speckle image can be hardly used for face anti-spoofing detection. The three-dimensional structured light camera needs to be redesigned, so that the speckle image can be both used for reconstructing a depth map and used for face anti-spoofing detection. For light point living body detection, currently, a lot of three-dimensional structured light hardware has problems such as an excessively small light point, excessively low luminance, uneven luminance distribution of each light point, and being prone to impact of a distance change. In this disclosure, a structure and a light-emitting parameter of the three-dimensional structured light camera existing in the industry may be designed, so that a feature in the obtained speckle image can be well used for face anti-spoofing detection. For example, improvement may be made without affecting map construction, and a main improvement direction is to increase luminance and a size of the light point, increase luminance evenness, and increase straightness of the light point.

S505: The authentication device performs face detection on the auxiliary image A and/or the light point image B for face position information, to obtain a face light point image and a face auxiliary image.

For the obtained auxiliary image A and the obtained light point image B, pixel alignment may be first performed. A specific alignment manner may be performing alignment based on an intrinsic matrix and an extrinsic matrix of the device when the two images are obtained, or performing alignment in an edge detection manner. A position of a face in an aligned auxiliary image A in an entire image is similar to a position of a face in an aligned light point image B in the entire image.

The authentication device may perform face position detection on the aligned auxiliary image A through a trained face detection model, or may perform face position detection on the aligned light point image B through a trained face detection model. If the auxiliary image A is an infrared light image, generally, there are many face detection models for an infrared light image in the industry that can be used in this step of this disclosure. In this disclosure, there is no need to train a face detection model in the training phase, so that costs can be reduced. If face detection is performed on the light point image, for a specific training method and detection method of the face detection model, refer to content described in step S4021. Details are not described herein again.

In this disclosure, an example in which a face position in the aligned auxiliary image A is obtained through a face detection model is used. After the face position in the aligned auxiliary image A is obtained, a face auxiliary image may be captured from the aligned auxiliary image A based on the face position information, or a face light point image may be captured from the aligned light point image B based on the face position information.

S506: The authentication device performs face anti-spoofing detection on the authenticatee based on the face auxiliary image and the face light point image.

Because two images are used together for face anti-spoofing detection in this step, a face anti-spoofing detection model used in this step also needs to receive the two images. For example, the face anti-spoofing detection model first performs feature extraction on the two images, then performs feature fusion on extracted features, and then performs classification based on a fused feature, to distinguish whether the light point image is an image formed by a natural person. A model structure of the face anti-spoofing detection model used in this step may be modified based on the face anti-spoofing detection model described in the foregoing embodiments. For example, a modification policy may be performing channel superimposing on an input image at an input layer of the model; dividing a feature extraction structure of the model into two branches, and then adding a feature fusion layer; or merging output results of two models.

The face anti-spoofing detection model in this disclosure is also trained by using face auxiliary training images and face light point training images, and attack material auxiliary training images and attack material light point training images during training. A manner of obtaining the training images is similar to the manner of obtaining face auxiliary images and face light point images during identity authentication. Details are not described herein again. A specific training manner is as follows: the face auxiliary training images and the face light point training images are used as a group, the attack material auxiliary training images and the attack material light point images are used as a group, and the two groups are input into a basic model of the face anti-spoofing detection, to adjust a model parameter, and finally obtain a face anti-spoofing detection model that can determine whether the face in the image is a natural face based on the input face auxiliary image and face light point image.

When the face anti-spoofing detection result indicates that the authenticatee is an attack material, the authentication device may return an identity authentication failure response to the authenticatee through voice or text, and prompt the authenticatee to continue to perform authentication by using a natural face, or generate an alarm. In this case, face recognition is not continued in the identity authentication phase. When the face anti-spoofing detection result indicates that the authenticatee is a natural person, the result indicates that face anti-spoofing detection is passed, and the face light point image or the face auxiliary image obtained in S505 may continue to be used for face recognition. That is, step S507 continues to be performed.

S507: The authentication device performs face recognition based on the face light point image or the face auxiliary image, to obtain a recognition result.

Face recognition may be arbitrarily performed by using the face light point image or the face auxiliary image. A manner of performing face recognition by using the face light point image is the same as the step in step S4023. Details are not described herein again. If face recognition is performed by using the face auxiliary image, a used face recognition model is a model obtained through training based on a labeled training image that has a same property as the auxiliary image, for example, an infrared light training image.

S508: Perform identity authentication on the authenticatee based on the recognition result.

The foregoing step is the same as step S4024. Details are not described herein again.

In the method of the foregoing embodiment of this disclosure, in S501 to S508, identity authentication is performed by combining an auxiliary image and a light point image, so that advantages of the auxiliary image and the light point image can be superimposed, and the face anti-spoofing detection result during identity authentication is more accurate.

In this disclosure, the authentication device 200 in FIG. 2 may perform the foregoing steps S401 and S402 and detailed steps S4012 and S4013 and S4021 to S4024, or perform some or all of the foregoing steps S502 to S508.

In this disclosure, the front-end device 310 shown in FIG. 3 may perform the foregoing step S401 and detailed steps S4012 and S4013, or perform some or all of the foregoing steps S502 to S504. The back-end device 320 may perform the foregoing step S402 and detailed steps S4021 to S4024, or perform some or all of the foregoing steps S505 to S508.

The foregoing step S402, detailed steps S4021 to S4024, and steps S505 to S508 may also be performed by an authentication apparatus. The authentication apparatus may include a receiving module and a processing module. The receiving module is configured to receive a light point image and/or an auxiliary image from another device or system. The processing module is configured to perform the authentication methods described in the foregoing steps.

The descriptions of procedures corresponding to the foregoing accompanying drawings have respective focuses. For a part that is not described in detail in a procedure, refer to related descriptions of another procedure.

All or some of the foregoing embodiments may be implemented by using software, hardware, firmware, or any combination thereof. When the software is used for implementing the embodiments, all or some of the embodiments may be implemented in a form of a computer program product. A computer program product for implementing identity authentication includes one or more computer instructions for performing identity authentication. When the computer program instructions are loaded and executed on a computer, all or some of the procedures or functions according to the foregoing method embodiments of this disclosure are generated.

The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), or a semiconductor medium (for example, an SSD).

What is claimed is:

1. An apparatus, comprising: an image sensor configured to capture a light point image of an authenticatee under irradiation of multi-light points, wherein the light point image comprises a plurality of central bright spots from reflected light, a plurality of diffusion spots from diffused light, and a non-light point region, wherein each of the central bright spots is surrounded by one of the diffusion spots, and wherein the diffusion spots are surrounded by the non-light point region; and a communication interface coupled to the image sensor and configured to: send, to a remote device, the light point image; and receive, from the remote device, an authentication result that is based on face anti-spoofing detection on the light point image.

2. The apparatus of claim 1, further comprising a light point transmitter configured to transmit the multi-light points to the authenticatee, wherein the multi-light points are separated from each other by non-illuminated areas, and wherein the image sensor is further configured to obtain, from the authenticatee, the reflected light to generate the central bright spots and the diffused light to generate the diffusion spots.

3. The apparatus of claim 2, wherein the multi-light points comprise visible light points.

4. The apparatus of claim 2, wherein the light point transmitter is further configured to:
detect a sensitive part and a non-sensitive part of a face of the authenticatee; and
transmit, to the non-sensitive part, the multi-light points.

5. The apparatus of claim 2, wherein the multi-light points comprise invisible light points.

6. The apparatus of claim 1, further comprising a light point regulator configured to adjust parameters of the multi-light points, wherein the parameters comprise luminance of light, a size of a light point, a concentration degree of light points, a wavelength of light, or a light point arrangement manner.

7. The apparatus of claim 1, wherein the image sensor is further configured to obtain an auxiliary image of the authenticatee, wherein the communication interface is further configured to send, to the remote device, the auxiliary image, and wherein the face anti-spoofing detection is further on the auxiliary image.

8. An apparatus, comprising: a memory configured to store instructions; and one or more processors coupled to the memory and configured to execute the instructions to: receive a light point image of an authenticatee, wherein the light point image is from the authenticatee under irradiation of first multi-light points, wherein the light point image comprises a plurality of central bright spots from reflected light, a plurality of diffusion spots from diffused light, and a non-light point region, wherein each of the central bright spots is surrounded by one of the diffusion spots, and wherein the diffusion spots are surrounded by the non-light point region; and a face of the authenticatee; and perform, based on a face anti-spoofing detection model and the light point image, face anti-spoofing detection on the authenticatee to obtain an authentication result, wherein the face anti-spoofing detection model is a neural network model trained based on images in a light point image training set.

9. The apparatus of claim 8, wherein the images comprise a plurality of training images, and wherein first parameters of second multi-light points used when the plurality of training images are captured are within a same value range as second parameters of the first multi-light points.

10. The apparatus of claim 8, wherein the one or more processors are further configured to execute the instructions to:
input the light point image into a face detection model;
detect, by using the face detection model, the face in the light point image to obtain a face light point image;
input, into the face anti-spoofing detection model, the face light point image; and
detect, by using the face anti-spoofing detection model, whether the face is a natural face.

11. The apparatus of claim 10, wherein when detecting that the face is the natural face, the one or more processors are further configured to execute the instructions to input the face light point image into a face recognition model to obtain a face recognition result, and wherein the face recognition result is for verifying whether the authenticatee has a permission.

12. The apparatus of claim 8, wherein the one or more processors are further configured to execute the instructions to further perform, based on an auxiliary image of the authenticatee, the face anti-spoofing detection, and wherein the auxiliary image comprises a red-green-blue (RGB) image of the authenticatee or an infrared light image of the authenticatee.

13. A method, comprising: obtaining a light point image of an authenticatee, wherein the light point image is from the authenticatee under irradiation of first multi-light points, wherein the light point image comprises a plurality of central bright spots from reflected light, a plurality of diffusion spots from diffused light, and a non-light point region, wherein each of the central bright spots is surrounded by one of the diffusion spots, and wherein the diffusion spots are surrounded by the non-light point region; and performing, based on the light point image, face anti-spoofing detection on the authenticatee to obtain an authentication result.

14. The method of claim 13, wherein performing the face anti-spoofing detection comprises performing, based on a face anti-spoofing detection model, the face anti-spoofing detection, and wherein the face anti-spoofing detection model is a neural network model trained based on images in a light point image training set.

15. The method of claim 14, wherein the images comprise a plurality of training images, and wherein first parameters of second multi-light points used when the plurality of training images are captured are within a same value range as second parameters of the first multi-light points.

16. The method of claim 15, wherein the second parameters comprise at least one of luminance of light, a size of a light point, a concentration degree of light points, a wavelength of light, or a light point arrangement manner.

17. The method of claim 13, wherein obtaining the light point image comprises:
transmitting, to the authenticatee through a light point transmitter, the multi-light points; and
obtaining, through an image sensor, the reflected light and the diffused light formed by the authenticatee under the irradiation of the multi-light points,
wherein the reflected light generates the central bright spots, and
wherein the diffused light generates the diffusion spots.

18. The method of claim 17, wherein the multi-light points comprise visible light points or invisible light points.

19. The method of claim 13, wherein performing the face anti-spoofing detection comprises:
inputting the light point image into a face detection model;
detecting, by using the face detection model, the face in the light point image to obtain a face light point image;
inputting, into a face anti-spoofing detection model, the face light point image; and
detecting, by using the face anti-spoofing detection model, whether the face is a natural face.

20. The method of claim 19, wherein when detecting that the face is the natural face, the method further comprises inputting the face light point image into a face recognition model to obtain a face recognition result, and wherein the face recognition result is for verifying whether the authenticatee has a permission.

21. The method of claim 13, further comprising:
detecting a sensitive part and a non-sensitive part of the face; and
transmitting, to the non-sensitive part, the multi-light points.

22. The method of claim 13, further comprising obtaining an auxiliary image of the authenticatee, wherein the auxiliary image comprises a red-green-blue (RGB) image of the authenticatee or an infrared light image of the authenticatee, and wherein performing the face anti-spoofing detection further comprises performing, based on the auxiliary image, the face anti-spoofing detection.

* * * * *